Feb. 6, 1962 T. G. HOLMES Re. 25,120
TALLY INSTRUCTION APPARATUS FOR AUTOMATIC DIGITAL COMPUTERS
Original Filed Dec. 8, 1954 3 Sheets-Sheet 1
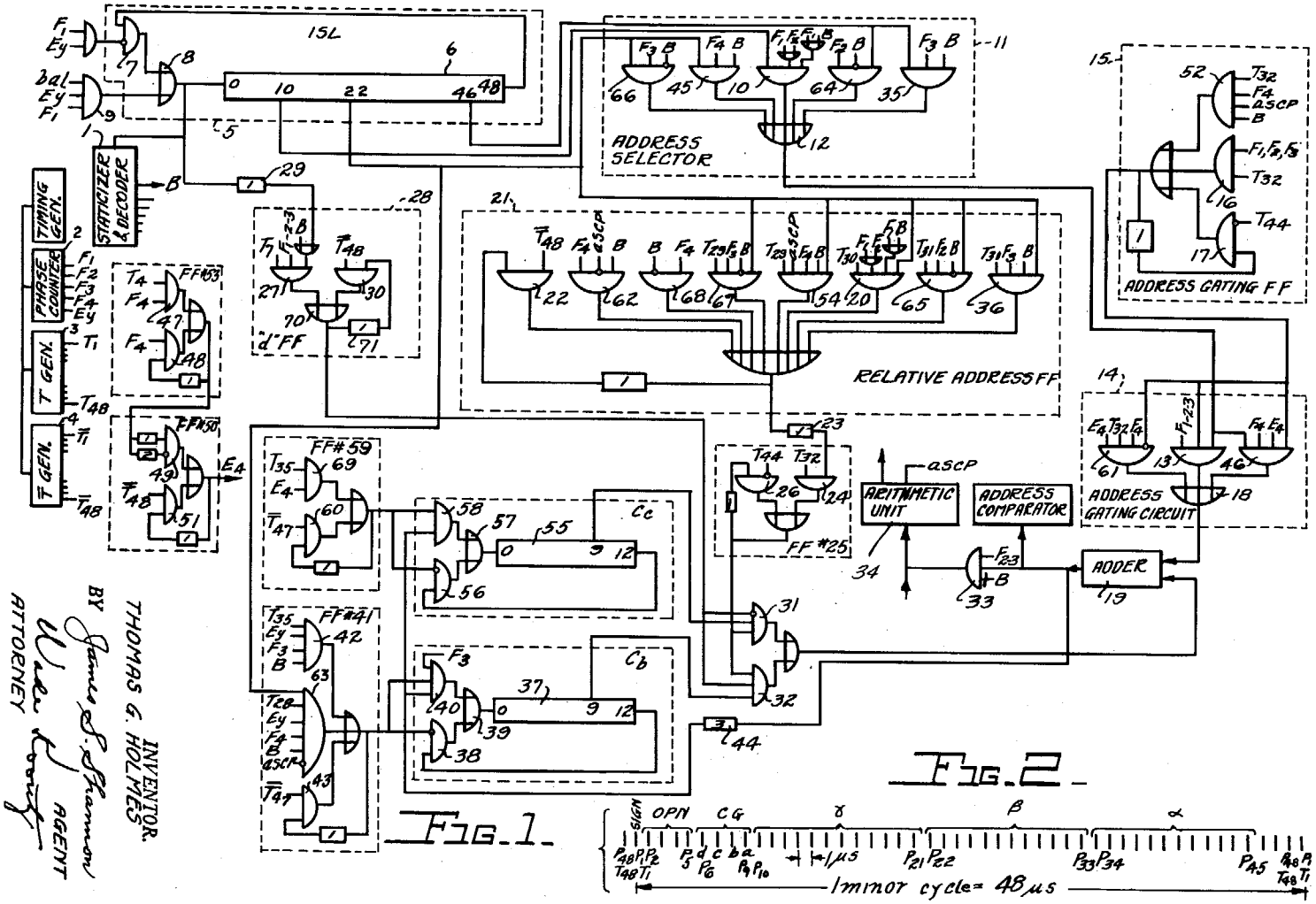
INVENTOR.
THOMAS G. HOLMES
BY James S. Shannon
AGENT
Wade Koontz
ATTORNEY INVENTOR.
THOMAS G. HOLMES
BY Wade Koontz
ATTORNEY
James L. Shannon
AGENT

TALLY INSTRUCTION APPARATUS FOR AUTOMATIC DIGITAL COMPUTERS

Original Filed Dec. 8, 1954 3 Sheets-Sheet 3

INVENTOR.
THOMAS G. HOLMES
BY Wade Koontz
ATTORNEY
James S. Shannon
AGENT

United States Patent Office

Re. 25,120
Reissued Feb. 6, 1962

25,120

TALLY INSTRUCTION APPARATUS FOR AUTOMATIC DIGITAL COMPUTERS

Thomas G. Holmes, Melbourne, Fla., assignor to Soroban Engineering, Inc., Melbourne, Fla., a corporation of Florida Original No. 2,874,901, dated Feb. 24, 1959, Ser. No. 474,044, Dec. 8, 1954. Application for reissue Jan. 17, 1961, Ser. No. 83,863

9 Claims. (Cl. 235—157)

Figure 3:
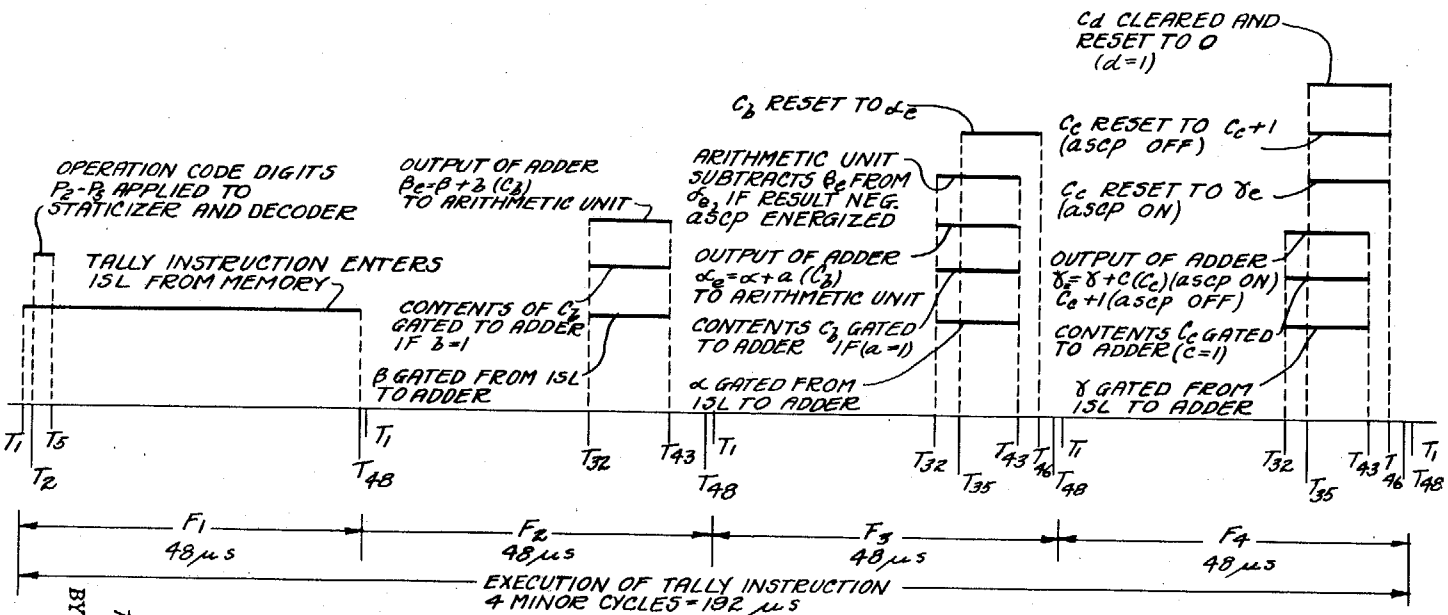

(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government of the United States for governmental purposes without payment to me of any royalty thereon.

Automatic digital computers have four basic components: the memory or storage component, the arithmetic component, the terminal component and the control component.

The memory or storage component consists of a number of storage locations or cells into which information can be inserted for storage and from which information can be extricated when needed by the computer. Numbers on which operations are to be performed, the results of such operations and instructions governing the operation of the computer are stored in the various memory cells. Each cell is identified by an address number.

The arithmetic component of the computer comprises all of the apparatus necessary to perform the arithmetic operations of addition, subtraction, multiplication and division.

The terminal component comprises all of the apparatus required to transfer information into and out of the computer.

Finally, the control component, with which this invention is concerned, comprises all of the apparatus required to take instructions from the memory, to analyze these instructions and to issue appropriate commands causing the computer to execute the instructions[.], *the above three functions being defined as and being hereinafter referred to as a computer directive.*

It is the object of this invention to simplify the instruction programing of iterative operations. Briefly, this is accomplished by providing, as part of the control component, apparatus operative in response to a special instruction, termed a tally instruction, to cause the computer to repeatedly refer to and carry out a single instruction stored in one of the cells of the memory. Both the address of the instruction to be repeated and the number of repetitions desired are designated in the tally instruction. The apparatus makes use of a special counter, referred to as the base counter, for keeping a tally of the number of times the designated instruction has been performed during execution of the tally instruction. Also, as will be explained in more detail later, one or more of the addresses in the repeated instruction are made relative to the base counter, which is reset at each execution by the tally instruction, so that the tally instruction is able to effectively modify these addresses without altering the repeated instruction itself. When the tally equals the number of repetitions specified in the tally instruction the computer automatically refers to the next instruction in the sequence of instructions stored in the memory.

A more detailed description of the invention will be given in connection with the specific embodiment thereof shown in the accompanying drawings in which—

Figure 4:
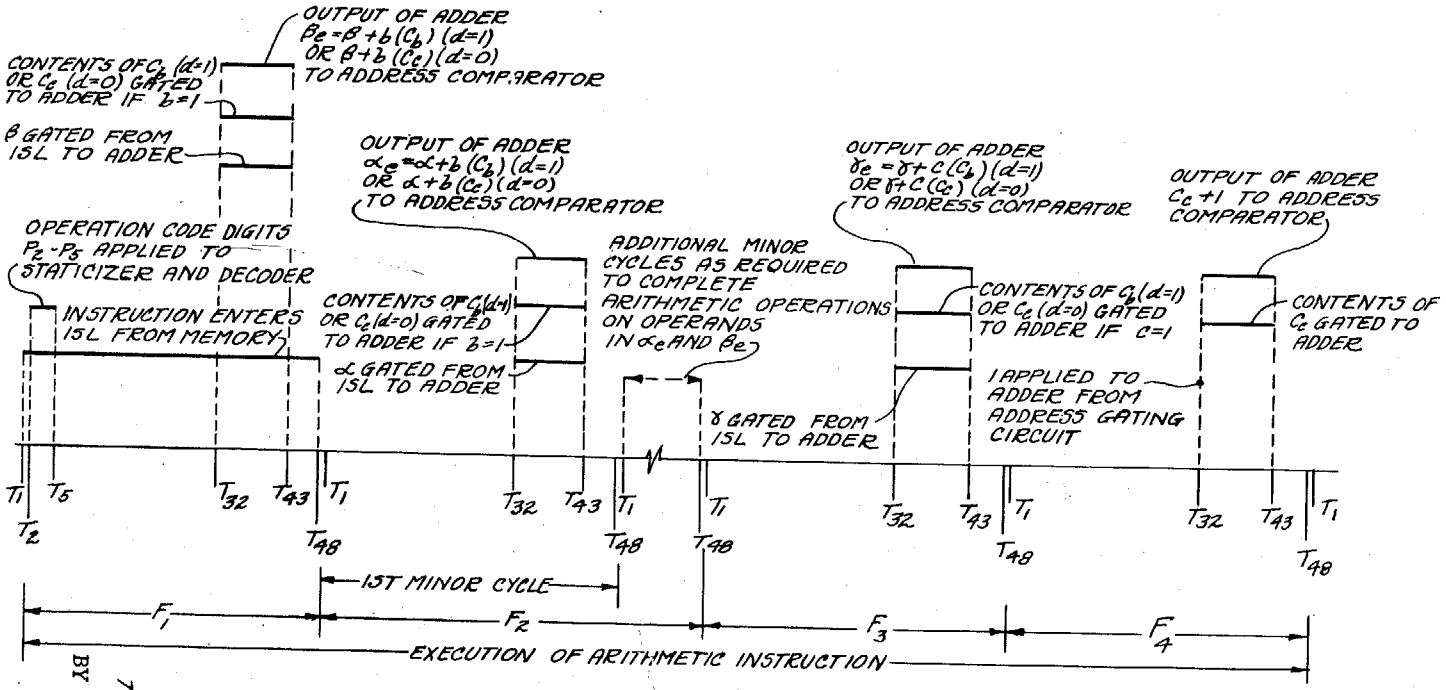

FIG. 1 illustrates the composition of an instruction word in the specific embodiment described, and FIG. 2 is a logical diagram of that part of the computer control component involved in execution of the tally instruction, and FIGS. 3 and 4 show timing diagrams for the execution of a tally instruction and an arithmetic instruction, respectively.

In the specific embodiment of the invention described herein a computer word, i.e. the group of digits representing a number or an instruction, consists of 48 binary digits in the form of a serial electrical pulse code having a pulse frequency of one megacycle per second. The component parts of both number and instruction words are shown in FIG. 1. Electrical pulses are present or absent at the time positions of digits $P_1$–$P_{48}$ depending upon whether the particular digit is a 1 or a 0. The length of a word is 48 microseconds, this period being designated a minor cycle. Digits $P_{46}$–$P_{48}$ are not normally used and may be regarded as zeros.

In the case of a number word, digit $P_1$ represents the sign (+ or —) of the number and digits $P_2$–$P_{45}$ its absolute value, $P_2$ being the least significant digit. In the case of an instruction word, digit $P_1$ has no significance as a sign but may be utilized for some special function such as halting the computer; digits $P_2$–$P_5$ constitute a 4-digit code designating the operation to be performed; digits $P_6$–$P_9$ constitute a 4-digit relative address control group; and remaining digits $P_{10}$–$P_{45}$ are divided into three 12-digit groups designated $\alpha$, $\beta$ and $\gamma$. Such an instruction is of the three-address type, $\alpha$, $\beta$ and $\gamma$ being the three "addresses," and normally contains no information as to the location of the next instruction. Therefore the instructions must be arranged in sequence in the memory and a control counter that is increased by one each time an instruction is performed is required to designate the memory cell containing the next instruction. The control counter may be reset by certain logical operations including the tally instruction as will be seen later.

In conventional instructions the numbers $\alpha$, $\beta$ and $\gamma$ may be absolute or they may be relative to a control counter $C_c$ or a base counter $C_b$ as determined by the digits, a, b, c, d of the relative address control group. Accordingly, the effective values $\alpha_e$, $\beta_e$ and $\gamma_e$ of these numbers are determined as follows:

| if d=0 | if d=1 |
|---|---|
| $\alpha_e=\alpha+a(C_c)$<br>$\beta_e=\beta+b(C_c)$<br>$\gamma_e=\gamma+c(C_c)$ | $\alpha_e=\alpha+a(C_b)$<br>$\beta_e=\beta+b(C_b)$<br>$\gamma_e=\gamma+c(C_b)$ |

where a, b and c are either 1 or 0 and $(C_c)$ and $(C_b)$ represent the contents of the control and base counters respectively. As summarized in the above equations, the effective value of an address is its absolute value modified by the contents of either the control counter or the base counter. If the address is absolute, its effective value equals its absolute value. If relative, the effective value equals its absolute value plus the contents of one of the counters. The digits a, b and c indicate whether the associated addresses alpha, beta and gamma are absolute (digit=0) or relative (digit=1). The digit d indicates the counter to which the address is relative (d=0 indicates control counter and d=1 indicates base counter). For example, in the case of the alpha address the effective value equals alpha when the address is absolute (a=0). When relative (a=1), the effective value equals alpha plus the contents of the control counter (d=0) or alpha plus the contents of the base counter (d=1). The function of the control counter has already been described. The base counter is an additional counter used as an adjustable reference point for relative addresses and as a tally keeping device in the performance of the tally instruction. The base counter may be changed or reset by a tally instruction only, as will be seen later in the description of FIG. 2. The term "base" is used simply to distinguish this counter from the control counter. Other than use, there is no essential difference in the two counters as will be apparent from the subsequent description of FIG. 2.

If the instruction calls for an arithmetic operation, $\alpha_e$ and $\beta_e$ are the addresses in the memory of the two operands and $\gamma_e$ designates the memory cell in which the result is to be stored. In instructions calling for non-arithmetic operations these numbers may or may not represent memory addresses depending upon the operation to be performed. For example, in an instruction to read a specified number of words from a specified input device into the memory beginning with a specified memory cell, $\alpha_e$ may represent the number of words, $\beta_e$ may designate the input device, and $\gamma_e$ may be the address of the memory cell receiving the first word.

The tally instruction differs from conventional instructions of the above type in that the relative address feature is more restricted. In the tally instruction $\alpha$ and $\beta$, if relative, are always relative to the base counter, and $\gamma$, if relative, is always relative to the control counter. Thus, in the tally instruction, $$\alpha_e=\alpha+a(C_b)$$
$$\beta_e=\beta+b(C_b)$$
$$\gamma_e=\gamma+c(C_c)$$

These equations characterize the tally instruction in the same manner that the preceding equations characterize conventional instructions. The digits a, b and c, which appear in the control group (CG) of the instruction (FIG. 1), determine whether the corresponding address is absolute or relative as explained for the preceding equations. The control digit d in this case does not designate the reference counter but serves a special purpose which will be explained later.

In the tally instruction, $\alpha$ designates the amount by which the base counter is increased each time the tally instruction is executed. Its value is usually one but may be greater than one in certain cases as will be shown later. The $\beta$ number is indicative of the number of times the designated instruction is to be repeated. The $\gamma$ number is the memory address, absolute or relative depending upon the value of c, of the instruction to be repeated.

In executing the tally instruction the control component of the computer determines $\alpha_e$, $\beta_e$ and $\gamma_e$, and compares the binary number $\alpha_e$ with the binary number $\beta_e$. Depending upon this comparison one of the following two courses of action takes place:

(1) $\alpha_e<\beta_e$: The base counter $C_b$ is reset to $\alpha_e$ and the control counter $C_c$ is reset to $\gamma_e$. The computer therefore looks for its next instruction in the memory cell whose address is $\gamma_e$.

(2) $\alpha_e\geqq\beta_e$: $C_b$ is reset to $\alpha_e$ if d=0 and to 0 if d=1. One is added to the contents of the control counter so that the computer is referred to the next instruction in the sequence of instructions.

As already mentioned $\alpha$, $\beta$ and $\gamma$ are each 12-digit binary numbers. In order to abbreviate the writing of instructions as much as possible the hexadecimal system of binary notation is used. In this system each of the sixteen possible combinations of four binary digits are designated by hexadecimal digits as follows:

| Hex. | Binary | Hex. | Binary | Hex. | Binary |
|---|---|---|---|---|---|
| 0 | 0000 | 5 | 0101 | A | 1010 |
| 1 | 0001 | 6 | 0110 | B | 1011 |
| 2 | 0010 | 7 | 0111 | C | 1100 |
| 3 | 0011 | 8 | 1000 | D | 1101 |
| 4 | 0100 | 9 | 1001 | E | 1110 |
| | | | | F | 1111 |

Thus the binary number 100011010110 becomes the hexadecimal number 8D6. In an instruction written in hexadecimal form $\alpha$, $\beta$ and $\gamma$ are each represented by three hexadecimal digits and the relative address control group and operation code are each represented by one hexadecimal digit. A typical instruction therefore may be of the form

| $\alpha$ | $\beta$ | $\gamma$ | CG | OPN |
|---|---|---|---|---|
| 61B | 032 | 00D | B | 3 |

As is apparent from the preceding table, the alpha address 61B is the binary number $$\overbrace{6}^{0110}\ \overbrace{1}^{0001}\ \overbrace{B}^{1011}$$

similarly the beta address 032 is the binary number 000000110010 and the gamma address 00D is the binary number 000000001101. The control group CG represented by hexadecimal B is the binary number 1011 and the operation code OPN represented by hexadecimal 3 is the binary number 0011.

The following examples will serve to illustrate specific uses of the tally instruction. These examples involve the use of various instructions which are defined below:

| Code | Operation | Description |
|---|---|---|
| 0 | Input | Insert $\alpha_e$ number of words from $\beta_e$ input unit into memory starting with $\gamma_e$ memory cell. |
| 3 | Number Conversion. | (a) $\beta$ even: Convert decimal number in $\alpha_e$ to binary and insert in $\gamma_e$. (b) $\beta$ odd: Convert binary number in $\alpha_e$ to decimal and insert in $\gamma_e$. |
| 4 | Subtraction | Subtract contents of $\beta_e$ from contents of $\alpha_e$ and place the difference in $\gamma_e$. |
| 5 | Addition | Add the contents of $\alpha_e$ to the contents of $\beta_e$ and place the sum in $\gamma_e$. |
| 9 | Multiplication (rounded). | Multiply contents of $\alpha_e$ by contents of $\beta_e$ and place product, rounded to 44 binary digits, in $\gamma_e$. |
| A | Tally | Compares $\alpha_e$ with $\beta_e$. If $\alpha_e<\beta_e$: Resets $C_b$ to $\alpha_e$ and $C_c$ to $\gamma_e$. If $\alpha_e\geqq\beta_e$: Resets $C_b$ to 0(b=1) or 1(b=0) Adds one to $C_c$. |

(1) It is desired to add individually the 5 numbers in memory cells 012–016 to the 5 numbers in memory cells 00D–011 and place the sums in the 5 memory cells 00D–011. The coding for this problem utilizing the tally instruction would be as follows, the necessary instructions being placed in cells 07A and 07B and the count in $C_b$ being initially 000:

| Cell # | $\alpha$ | $\beta$ | $\beta$ | CG(abcd) | OPN |
|---|---|---|---|---|---|
| 07A | 012 | 00D | 00D | F(1111) | 5 |
| 07B | 001 | 005 | 07A | 9(1001) | A |
| 07C | | | | | |

When the control counter reaches 07A the computer operates in response to the instruction in this cell to add the contents of cell 012 to the contents of cell 00D and place the sum in cell 00D, the sum replacing the operand originally in this cell. The control counter then advances to 07B which is the address of the cell containing the tally instruction. With $C_b$=000, $\alpha_e$=001 and $\beta_e$=005. Further, since C=0, $\gamma_e=\gamma$=07A. Therefore in performing the tally instruction $C_b$ is reset to 001 and $C_c$ is reset to 07A. The computer as a result returns to the instruction in 07A.

As seen from the relative address control group of the instruction in 07A all of its addresses are relative (a, b, c=1) and they are relative to the base counter (d=1). Since $C_b$ was initially set to zero, in the first execution of this instruction $\alpha_e=\alpha$=012, $\beta_e=\beta$=00D and $\gamma_e=\gamma$=00D. However, the second time this instruction is referred to $C_b$=001 and as a result $\alpha_e$=013, $B_e$=00E and $\gamma_e$=00E. Therefore in the second execution, the number in 013 is added to the number in 00E and the sum placed in 00E. The computer is then advanced by the control counter to the tally instruction in 07B for the second time.

In the second execution of the tally instruction the contents of $C_b$ is 001 instead of 000 and therefore $\alpha_e$, the number to which $C_b$ is reset, becomes 002. Since this number is still less than 005, $C_c$ is again reset to 07A and the computer refers to the instruction in this cell for the third time. In the third execution of this instruction, with $C_b$=002, $\alpha_e$=014, $\beta_e$=00F and $\gamma_e$=00F.

The above process continues until at the fourth reference to the tally instruction following the fourth execution of the instruction in 07A, $C_b$=004 and $\alpha_e$=005. Since $\alpha_e$ now equals $\beta_e$ the fourth execution of the tally instruction causes $C_b$ to be reset to 0 (d=1) and adds one to the contents of $C_c$ (07B) thereby causing the computer to seek its next instruction in memory cell 07C.

(2) As a second example assume that it is desired to read ten data words from a specified input device into consecutive memory cells beginning with the cell whose address is 0A0. Since input devices usually supply number words in binary coded decimal form it is necessary that these words be converted to true binary numbers. Utilizing the tally instruction and assuming the initial setting of the base counter $C_b$ to be 000, the coding may be as follows:

| Cell # | $\alpha$ | $\beta$ | $\gamma$ | CG(abcd) | OPN |
|---|---|---|---|---|---|
| 001 | 00A | 001 | 0A0 | 0(0000) | 0 |
| 002 | 0A0 | 000 | 0A0 | B(1011) | 3 |
| 003 | 001 | 00A | FFF | B(1011) | A |
| 004 | | | | | |

The instruction in cell 001 calls for reading ten (00A) words from input device 001 into consecutive memory cells starting with the memory cell whose address is 0A0. When this operation has been performed the control counter advances the computer to memory cell 002. The instruction in this cell calls for converting the number in cell 0A0 to binary form and storing the converted number in cell 0A0. The $\alpha$ and $\gamma$ addresses in this instruction are relative to the base counter (a, c and d=1) but, since the initial setting of $C_b$ is zero, $\alpha_e=\alpha$ and $\gamma_e=\gamma$ in the initial execution of the instruction.

The conversion of the remaining nine numbers is accomplished through the tally instruction in cell 003. When this instruction is reached for the first time $C_b$=000, $\alpha_e$=001 and $\beta_e$=00A. Since $\alpha_e<\beta_e$ $C_c$ is reset to $\gamma_e$ and as a result the computer looks for its next instruction in $\gamma_e$ which, being relative to the control counter (c=1), is 002 (FFF+003=002). Since $C_b$ was reset to 001 by the tally instruction and since the $\alpha$ and $\gamma$ addresses of the instruction in 002 are relative to $C_b$, the second execution of this instruction causes the number in 0A1 to be converted to binary form and inserted in 0A1.

The tally instruction is now reached for the second time. This time $\alpha_e$=002 which is still less than $\beta_e$ and, by the above described process, results in $C_c$ again being reset to $\gamma_e$ or 002. The instruction in this cell is therefore executed a third time. Since now $C_b$=002, the third execution results in the number in 0A2 being converted and stored in 0A2.

After the tenth execution of the instruction in 002 the count in the base counter $C_b$ stands at 009. Therefore, in the ensuing execution of the tally instruction $$\alpha_e=0A0=\beta_e$$

Consequently $C_b$ is reset to 0 (d=1) and the control counter $C_c$ is advanced by one to 004.

(3) Computing the algebraic sum of a plurality of numbers is another situation in which the tally instruction may be utilized to advantage. Assume it is desired to compute the algebraic sum of 15 numbers located in consecutive memory cells beginning with 07F. The sum will be accumulated in cell 00D. In contrast with the preceding problems it is assumed that the initial setting of the base counter $C_b$ is 00A. The necessary instructions, located in memory cells 005, 006 and 007, are as follows:

| Cell # | $\alpha$ | $\beta$ | $\gamma$ | CG(abcd) | OPN |
|---|---|---|---|---|---|
| 005 | FFF | FFF | 00D | 0(0000) | 4 |
| 006 | 00D | 075 | 00D | 5(0101) | 5 |
| 007 | 001 | 019 | FFF | B(1011) | A |

The instruction in 005 clears 00D by subtracting the number in FFF from itself and placing the difference which is zero in 00D. Since the $\beta$ address in the instruction in 006 is relative to $C_b$ (b, d=1), $$\beta_e=075+00A=07F$$

This instruction therefor specifies that the number in 00D be added to the number in 07F and the result placed in 00D. Since the number initially in 00D is 000 the first execution of the instruction effectively places the number in 07F in 00D.

The control counter now advances the computer to the tally instruction in 007. Since the initial count in $C_b$ is 00A, $\alpha_e$=001+00A=00B which is less than 023 ($\beta_e$). Therefore the control counter $C_c$ is reset to $$\gamma_e=FFF+007=006$$

and the computer returns to the instruction in 006. In the second execution of this instruction the number in 00D is added to the number in 080 (075+00B) and the sum placed in 00D.

The above process continues until after the 15th execution of the instruction in 006 the final sum is in 00D and the count in $C_b$ is 018. Consequently, in the next execution of the tally instruction $\alpha_e$=001+018=019=$\beta_e$ and the computer takes its next instruction from 008 ($C_c$+1), $C_b$ being reset to 0 (d=1).

(4) In the preceding examples $\alpha$ in the tally instruction was always 001. In certain situations $\alpha$ may be an integer larger than one. For example, assume that it is desired to clear every other memory cell starting with cell 021 and ending with cell 03F. If the count in $C_b$ is initially zero the necessary instructions, stored in memory cells 1F0 and 1F1, are:

| Cell # | $\alpha$ | $\beta$ | $\gamma$ | CG (abcd) | OPN |
|---|---|---|---|---|---|
| 1F0 | FFF | FFF | 021 | 3(0011) | 4 |
| 1F1 | 002 | 01F | 1F0 | 9(1001) | A |

In the instruction in 1F0 $\gamma$ is relative to $C_b$ (c, d=1). Since initially $C_b$=000 the first execution of the instruction clears cell 021. In the second execution $C_b$=002 and cell 023 is cleared. After the last cell 03F has been cleared the count in $C_b$ stands at 01E. Therefore in the following execution of the tally instruction $\alpha_e$=020 which is greater than 01F and results in $C_b$ being reset to 0 (d=1) and one being added to $C_c$ so that the computer looks for its next instruction in 1F2.

(5) As a final example assume that it is desired to compute the value of the integral $$\int_0^{\prime} \sin x dx$$

by Simpson's rule. If the interval of integration is divided into 20 subintervals of .05 radians each the value of this integral is given by the expression $$\frac{.05}{3}[y_0=4(y_1+y_3+\ldots+y_{19})+2(y_2+y_4+\ldots y_{18})+y_{20}]$$

This expression may be rewritten as $$\frac{.05}{3}(y_0+y_{20})+\frac{.2}{3}(y_1+y_3+\ldots+y_{19})+\frac{.1}{3}(y_2+y_4+\ldots+y_{18})$$

Assume further that the required 20 values of y=sin x are stored in consecutive memory cells starting with 100; that the fractions $$\frac{.05}{3}, \frac{.2}{3} \text{ and } \frac{.1}{3}$$

are stored in appropriate memory cells $K_1$, $K_2$ and $K_3$, respectively; and that the initial setting of the base counter $C_b$ is zero. The necessary instructions, stored in consecutive memory cells 020–028, are as follows:

| Cell # | $\alpha$ | $\beta$ | $\gamma$ | CG (abcd) | OPN | Remarks |
|---|---|---|---|---|---|---|
| 020 | $K_1$ | 100 | 00C | 0(0000) | 9 | $\frac{.05}{3}y_0$ in 00C |
| 021 | $K_1$ | 114 | FFF | 0(0000) | 9 | $\frac{.05}{3}y_{20}$ in FFF |
| 022 | 00C | FFF | 00C | 0(0000) | 5 | $\frac{.05}{3}(y_0+y_{20})$ in 00C |
| 023 | $K_2$ | 101 | FFF | 5(0101) | 9 | $\frac{.2}{3}y_i$ in FFF; i=1, 3, . . . 19 |
| 024 | 00C | FFF | 00C | 0(0000) | 5 | $\frac{.05}{3}(y_0+y_{20})+\frac{2}{3}\Sigma y$; i=1, 3, . . . 19 |
| 025 | 002 | 013 | FFE | B(1011) | A | Repeats 023 and 024 until all of $y_1, y_3, \ldots y_{19}$ appear in above sum. |
| 026 | $K_3$ | 102 | FFF | 5(0101) | 9 | $\frac{.1}{3}y_i$ in FFF; i=2, 4, 6, . . . 18 |
| 027 | 00C | FFF | 00C | 0(0000) | 5 | $\frac{.05}{3}(y_0+y_{20})+\frac{2}{3}(y_1+y_3+\ldots+y_{19})+\frac{1}{3}\Sigma y_i$; i=2, 4, 6 . . . 18 |
| 028 | 002 | 011 | FFE | B(1011) | A | Repeats 026 and 027 until all of $y_2, y_4, \ldots y_{18}$ appears in preceding sum. |

The operation of the above instructions should be clear from the accompanying remarks and the explanation of the tally instruction given in the preceding problems. The $\beta$ address of the instruction in 023 is relative to the base counter. Since $y_1, y_3, y_5, \ldots y_{19}$ are located in alternate memory cells the effective $\beta$ address in this instruction must be increased by 002 each time the instruction is performed. This is accomplished by making $\alpha$=002 in the tally instruction. A similar situation exists in connection with the instruction in 026 and the tally instruction 028.

After $$\frac{.2}{3}y_{19}$$

has been added by the final performance of the instruction in 024 the base counter has a count of 012. In the subsequent execution of the tally instruction in 025, $\alpha_e$=014 which is greater than $\beta_e$(013). The base counter is therefore reset to 0 (d=1) and the control counter is increased to 026. Similarly, after $$\frac{.1}{3}y_{18}$$

has been added by the final execution of the instruction in 027 the base counter has a count of 010. In the subsequent execution of the tally instruction in 028, $\alpha_e$=012 which is greater than $\beta_e$(011). Therefore, the base counter is reset to 0 (b=1) and the control counter is advanced to 029 where the computer seeks its next instruction.

From the above examples it is seen that the tally instruction affords a simplified and rapid way of (1) causing the computer to repeat a set of instructions a specified number of times, and (2) changing the effective addresses in these instructions without modifying the instructions themselves.

That part of the computer control component involved in the performance of the tally instruction is shown in block form in FIG. 2. In this diagram only the gating means, the delay means, adders, etc. are illustrated. Further it is assumed that the only delays in the system are those occurring in the designated delay blocks. The illustrated circuit therefore differs from a practical circuit in that in the latter case it would be necessary to provide sufficient amplification at various points in the circuit to insure adequate signal levels, and the inherent delays produced by the various elements of the circuit such as amplifiers, gates, adders, etc. would have to be taken into account in the design of the delay elements. Since these are merely matters of design they are ignored in FIG. 2 for the sake of simplicity.

The gating means are illustrated in FIG. 2 as semicircular blocks with the output line extending from the curved side and the input lines entering through the straight side. Two types of gates, designated in the computer art as "and" gates and "or" gates, are used. The construction and operation of such gates are well understood and are described in the literature such, for example, as the Computer Issue of the Proceedings of the Institute of Radio Engineers, vol. 41, No. 10, October 1953, pages 1300–1313 and 1381–1387. These gates may be realized in different ways, the construction of the gate being immaterial in FIG. 2 provided the desired function is performed. Briefly, an "and" gate is one in which an input must appear simultaneously on each of the input lines in order for an output to be produced, and an "or" gate is one in which an input on one or more of the input lines will produce an output. Gate 45 is an example of an "and" gate and gate 12 is an example of an "or" gate. The two are distinguished by having the input lines stop at the straight side in the case of an "and" gate and extend through to the curved side in the case of an "or" gate. An "and" gate may also be of the inhibited type, an example of which is gate 66. In this type the inhibit input line is designated by a small circle at the point where the line touches the straight side. In the case of the inhibited "and" gate, an output is produced only in the presence of signals on all input lines except the inhibiting input line. A signal on the inhibiting line prevents an output under any condition.

The circuit of FIG. 2 makes use of dynamic flip-flop circuits, abbreviated FF, in several places. This type of circuit, also described on pages 1309–1310 of the above cited issue of the Proceedings of the I.R.E., has two stable conditions in one of which "off" it has no output and in the other of which "on" it has an output in the form of a one megacycle pulse train. The "*d*" FF of FIG. 2 is of this type. The circuit contains a 1 microsecond delay loop which includes "or" gate 70, delay 71, and "and" gate 30. Assuming the FF to be "off" it may be turned "on" by the application of a pulse from gate 27 to the input of gate 70. This pulse appears in the output of gate 70 and also travels around the delay loop to the input of gate 70, assuming an input to the $\overline{T}_{48}$ line of gate 30, so that 1 microsecond later a second pulse appears in the output of this gate. Similarly, this second pulse appears 1 microsecond later in the output of gate 70 as a third pulse, and so on. Therefore, as long as an input is maintained on the $\overline{T}_{48}$ line of gate 30 the FF is "on" and has a one megacycle pulse output. Removal of the input to gate 30 on the $\overline{T}_{48}$ line breaks the feedback loop and returns the FF to its "off" condition.

The adder 19 in FIG. 2 may be of any type capable of adding binary numbers represented by successively occurring electrical pulses. An example may be found in FIG. 13–6, page 274, of High-Speed Computing Devices, Engineering Research Associates, McGraw-Hill, 1950.

The operation of the circuit of FIG. 2 is governed by a number of control voltages which are described as follows:

$F_1$, $F_2$, $F_3$, $F_4$: These voltages represent the four phases or major cycles through which the computer passes in executing an instruction. Each is a train of one megacycle pulses and has a duration of one or more minor cycles of 48 microseconds as defined in FIG. 1.

$E_y$: A train of 48 one megacycle pulses occurring during the first minor cycle of each phase.

$T_1$–$T_{48}$: Each represents one pulse per minor cycle occurring at the time indicated.

$\overline{T}_1$–$\overline{T}_{48}$: Each represents all 48 pulses of each minor cycle except the pulse occurring at the time indicated.

B: A train of one megacycle pulses on during performance of the tally instruction.

The B control voltage is generated by staticizer and decoder 1. The function of this device is to analyze the operation code of an instruction and energize appropriate control lines which condition the computer to carry out the operation called for by the code. The B control line is energized in response to the A operation code of the tally instruction and conditions the computer to execute the tally instruction. Such a decoder is an essential part of all stored program digital computers and is therefore a well known item in the computer art. See, for example, Fig. 5 on page 1303 and the paragraph starting at the bottom of this page in the Proceedings of the Institute of Radio Engineers, vol. 41, No. 10, October 1953. The remaining of the above described voltages are generated by apparatus generally indicated by blocks 2, 3 and 4. Since the design of these elements forms no part of the invention they are not shown in detail.

The operation of FIG. 2 in response to a tally instruction is as follows:

As already mentioned the execution of an instruction takes place in four phases, $F_1$, $F_2$, $F_3$ and $F_4$ of computer operation. The diagram in FIG. 3 illustrates the timing of the various operations taking place in the execution of the tally instruction and will be helpful in understanding the following description. In $F_1$ the tally instruction enters the instruction storage loop 5, abbreviated ISL, from the memory. The ISL comprises a 48 microsecond delay line 6, inhibited "and" gate 7 and "or" gate 8. During the first minor cycle $E_y$ of $F_1$ the tally instruction arrives from the memory on line ba1 and enters the ISL through gates 9 and 8, the digit $P_1$ (FIG. 1) entering first. At the same time gate 7 is inhibited, $E_y$ being on, so that anything already in the loop is erased. At the end of $E_y$, which in this case is also the end of $F_1$, the tally instruction is in the ISL. The operation code digits $P_2$–$P_5$ (FIG. 1), which for the tally instruction are A(1010), enter the ISL and are applied to the staticizer and decoder 1 at times $T_2$–$T_5$ of the first minor cycle ($E_y$) of $F_1$. Therefore, during $F_1$ the B output line of the staticizer and decoder is energized.

During $F_2$ (phase 2)

$$\beta_e=\beta+b(C_b)$$

is generated and sent to the arithmetic unit. This is accomplished as follows:

One input of gate 10 in address selector circuit 11 is connected to the 10 microsecond tap of delay line 6 in the ISL. This gate passes every pulse appearing at this tap during $F_2$ of B (tally) operation. The output of gate 10 passes through gate 12 to one of the inputs to gate 13 in the address gating circuit 14. The address gating FF 15 is turned on in $F_2$ by gate 16 at $T_{32}$ and off by inhibiting gate 17 at $T_{44}$. The output of this FF therefore is a series of 12 one megacycle pulses occurring at times $T_{32}$–$T_{43}$ of $F_2$; which pulses are applied to another input of gate 13. Since the third input of gate 13 has the $F_2$ control pulses applied thereto, this gate passes all of the pulses occurring at tap 10 of delay line 6 at times $T_{32}$–$T_{43}$. As may be determined from FIG. 1, the digits appear at the 10 microsecond tap at times $T_{32}$–$T_{43}$, and is thus gated through gates 13 and 18 to adder 19.

The "b" digit of the relative address control group appears at the 22 microsecond tap of delay line 6 at $T_{30}$ of $F_2$. If a pulse appears at this time (b=1) it is passed through gate 20 of relative address FF 21 and turns this FF on. FF 21 is turned off by gate 22 at $T_{48}$. Therefore, if b=1, the output of FF 21 is a train of one megacycle pulses occurring at $T_{30}$–$T_{47}$. After a one microsecond delay by element 23 these pulses are applied to gate 24 of FF #25 at $T_{31}$–$T_{48}$. FF #25 is turned on by gate 24 at $T_{32}$ and off by gate 26 at $T_{44}$. Therefore if b=1, the output of FF #25 is a train of 12 pulses at times $T_{32}$–$T_{43}$ of $F_2$. If b=0 this FF has no output.

During $F_2$ in the execution of the tally instruction (B on) the "d" FF is turned on by gate 27 at $T_7$ and off by gate 30 at $T_{48}$. The resulting output of this FF is a series of pulses from $T_7$ to $T_{47}$ which are applied to input circuits of gates 31 and 32. Gates 31 and 32 serve to gate the contents of the control counter $C_c$ and the base counter $C_b$, respectively, to the adder 19. During $F_2$ (and $F_3$), however, $C_c$ can not be so gated because of the inhibiting action of the output of the "d" FF on gate 31. The $\beta$ address, therefore, if relative, must be relative to $C_b$. If b=1, the 12-pulse output of FF #25 permits the 12-digit contents of $C_b$ to be gated to adder 19 at $T_{32}$–$T_{43}$. If b=0, there is no output from FF #25, as already explained, and the contents of $C_b$ do not reach the adder. The output of the adder is a 12-digit word at $T_{32}$–$T_{43}$ representing the desired sum $$\beta_e=\beta+b(C_b)$$

which passes through gate 33 to the arithmetic unit 34, this gate being open during $F_2$ (and $F_3$) of the B or tally operation.

During $F_3$ (phase 3) of the tally operation the sum $$\alpha_e=\alpha+a(C_b)$$

is obtained and sent to the arithmetic unit; also $C_b$ is reset to $\alpha_e$. This is accomplished as follows:

In $F_3$ the tally instruction is gated from the 46 microsecond tap of delay line 6 through gate 35 and gate 12 of the address selector circuit to gate 13 of the address gating circuit 14. Again, in $F_3$, the address gating FF 15 is turned on by gate 16 at $T_{32}$ and off by gate 17 at $T_{44}$, and its output train of 12 pulses occurring at times $T_{32}$–$T_{43}$ is applied to gate 13. Since the 12-digit $\alpha$ word appears at the 46 microsecond tap and at gate 13 at $T_{32}$–$T_{43}$, this word is gated through gates 13 and 18 to adder 19.

Gate 36 of the relative address FF 21 senses the relative address control digit "a" at the 22 microsecond tap of delay line 6 at $T_{31}$. If a pulse is present at $T_{31}$, indicating that a=1, the relative address FF is turned on by gate 36 at $T_{31}$ and off by gate 22 at $T_{48}$. The output pulse train of this FF, after a one microsecond delay by element 23, is applied to gate 24 of FF #25 at $T_{32}$–$T_{48}$. As a result, FF #25 is turned on by gate 24 at $T_{32}$ and off by gate 26 at $T_{44}$. The resulting output pulse train, occurring at $T_{32}$–$T_{43}$, is applied to gates 31 and 32 as before.

The operation of "d" FF 28 is the same as in $F_2$. Its output pulse train, occurring at $T_7$–$T_{47}$, operates as in $F_2$ to inhibit gate 31 but to act in the presence of an output from FF #25 (a=1) to apply the output of $C_b$ through gate 32 to adder 19 during the interval $T_{32}$–$T_{43}$. The output of the adder therefore is a 12-digit word at $T_{32}$–$T_{43}$ representing the desired sum $$\alpha_e=\alpha+a(C_b)$$

which passes through gate 33 to the arithmetic unit 34. If a=0, there is no output from FF #25 and therefore gate 32 does not open since one of its inputs is de-energized. In this case $\alpha$ only appears in the output of adder 19.

The base counter $C_b$ is reset to $\alpha_e$ in the following manner:

The count in $C_b$ is always a 12-digit binary number. The counter comprises a 12 microsecond delay line 37 connected through gates 38 and 39 in a closed loop. A word once inserted in the counter circulates around this loop until erased. Words are inserted through gate 40 which is controlled by FF #41. This FF is turned on by gate 42 at $T_{35}$ and off by gate 43 at $T_{47}$. Therefore the 12 digits of any word that happens to be in the counter always appear at the 0 tap or input of line 37 at $T_{35}$–$T_{46}$. However, since the 12 microsecond delay of the loop is only ¼ minor cycle the word circulates four times during each minor cycle and therefore its digits appear at the 0 tap also at the times $T_{47}$–$T_{10}$, $T_{11}$–$T_{22}$, and $T_{23}$–$T_{34}$. From this it is apparent that the digits appear at the 9 microsecond tap of line 37 at the times $T_{44}$–$T_7$, $T_8$–$T_{19}$, $T_{20}$–$T_{31}$ and $T_{32}$–$T_{43}$, the latter agreeing with the output of FF #25 which, as already explained, serves to gate the contents of $C_b$ through gate 32 to adder 19.

During the first minor cycle $E_y$ of $F_3$, FF #41 is turned on at $T_{35}$ and off at $T_{47}$ in the above described manner. The resulting output, occurring at $T_{35}$–$T_{46}$, inhibits gate 38 during this period, thus erasing the previous count, and opens gate 40 to any pulses occurring during this period. $\alpha_e$ occurs in the output of adder 19 at $T_{32}$–$T_{43}$ and, after a 3 microsecond delay by element 44, is applied to gate 40 at $T_{35}$–$T_{46}$ through which it enters $C_b$, thus resetting the base counter to $\alpha_e$.

The arithmetic unit 34 subtracts $\beta_e$ applied to it in $F_2$ from $\alpha_e$ applied to it in $F_3$. If $\alpha_e<\beta_e$ the difference is negative and the ascp line is energized with a continuous train of one megacycle pulses. If $\alpha_e\geqq\beta_e$ the ascp line is not energized.

The arithmetic unit 34 is of course the arithmetic unit for the entire computer and in it are performed the arithmetic processes of addition, subtraction, multiplication and division for all operations of the computer. An arithmetic unit is found in and is an essential component of all stored program automatic digital computers. In computers in which provision is made for a conditional transfer operation, and such provision may be considered universal in modern computers, the arithmetic unit determines if the condition calling for the transfer exits. Conditional transfer, which also goes under such names as algebraic comparison, absolute comparison, jump if minus, etc., involves a deviation from the regular stored sequence of instructions in the computer. The condition calling for this deviation is usually that a first specified number be less than a second specified number. The arithmetic unit determines if this condition exists by subtracting the second number from the first and sensing the sign of the difference. If minus, a control circuit is energized calling for a transfer or jump to a specified instruction address. Arithmetic units with means for sensing and signaling the conditional transfer situation are therefore well known in the art. An example is given in FIG. 4 on page 1303 of the Proceedings of the Institute of Radio Engineers, vol. 41, No. 10, October 1953. Here the sign determining unit has a line designated to control unit which is energized when the number in memory address $\alpha$ is less than the number in memory address $\beta$ and causes a conditional transfer operation to be performed. See the second paragraph of the second column on page 1303 and the descriptions of the comparison operations in Table I on page 1302. The tally instruction involves a conditional transfer in that if $\alpha_e<\beta_e$ the computer refers to the instruction in the address $\gamma_e$ rather than the next instruction in the sequence of instructions. The arithmetic unit of FIG. 4 in the above cited reference can sense this condition and therefore can be used for block 34 in FIG. 2 in this application, the line marked to control unit corresponding to the ascp line in FIG. 2.

The computer now progresses to $F_4$ (phase 4) in its execution of the tally instruction. In this phase one of two possible courses of action are taken depending upon whether ascp is energized ($\alpha_e<\beta_e$) or deenergized $\alpha_e\geqq\beta_e$). If ascp is energized, $C_c$ is reset to $\gamma_e$. If deenergized, one is added to $C_c$ and $C_b$ is reset to 0 if d=1 or left at $\alpha_e$, to which it was set in $F_3$ if d=0. The operation is as follows:

During $F_4$ the tally instruction is gated from the 22 microsecond tap of delay line 6 through gates 45 and 12 of the address selector circuit to gate 46 of the address gating circuit. Also, FF #53 is turned on by gate 47 at $T_4$ of $F_4$ and remains on until the end of $F_4$ when it is turned off by gate 48. The first pulse of the FF #53 output, after a delay of 1 microsecond, is applied to gate 49 of FF #50 and, after delay of an additional microsecond, is applied as an inhibiting pulse to the same gate. Therefore, only one pulse passes gate 49 which turns on FF #50 at $T_5$. FF #50 is turned off at $T_{48}$ by gate 51. This FF, therefore, is turned on only once during $F_4$, its output $E_4$ occurring at $T_5$–$T_{48}$ of the first minor cycle of $F_4$. This control voltage insures that the control counter will be reset only in $F_4$ and then only once.

If the ascp line is energized ($\alpha_e<\beta_e$), the address gating FF 15 is turned on in $F_4$ by gate 52 at $T_{32}$ and off by gate 17 at $T_{44}$. The 12-pulse output, occurring at $T_{32}$–$T_{43}$, is applied to gate 46 and serves to gate $\gamma$, occurring also at $T_{32}$–$T_{43}$, through gates 46 and 18 to adder 19.

The "c" digit of the relative address control group is sensed at the 22 microsecond tap of delay line 6 at $T_{29}$ by gate 54 of the relative address FF. If a pulse is present, indicating that c=1, FF 21 is turned on by gate 54 at $T_{29}$ and off by gate 22 at $T_{48}$. The resulting output, extending from $T_{29}$ to $T_{47}$, allows FF #25 to be turned on by gate 24 at $T_{32}$ and off by gate 26 at $T_{44}$ producing an output occurring at $T_{32}$–$T_{43}$.

The control counter $C_c$ is similar to the base counter $C_b$, already described, and has the same timing. The 12-digit binary word in $C_c$ circulates around a closed 12 microsecond loop consisting of 12 microsecond delay line 55 and gates 56 and 57. The count in $C_c$ is changed by inserting the new count through gate 58 at $T_{35}$–$T_{46}$ while, at the same time erasing the preceding count by inhibiting gate 56. As in $C_b$, gates 58 and 56 are controlled by the output of FF #59 which is turned on by gate 69 at $T_{35}$ and off by gate 60 at $T_{47}$, producing an output accurring at $T_{35}$–$T_{46}$. As in the case of $C_b$, the count appears at the 9 microsecond tap of line 55 at $T_{32}$–$T_{43}$.

The "d" FF 28 does not go on in $F_4$ and, with no output from this FF, gate 31 is not inhibited and permits the contents of $C_c$ to pass through this gate to added 19 provided FF #25 is on (C=1). The absence of an output from the "d" FF also blocks the application of the $C_b$ contents to the added through gate 32.

The output of adder 19 in phase 4, therefore, occurring at $T_{32}$–$T_{43}$, is $$\gamma_e=\gamma+c(C_c)$$

This address, which is the address in the memory from which the computer obtains its next instruction, is applied to the address comparator which performs the operations necessary to obtain the desired instruction from the memory. Also, the control counter $C_c$ is reset to $\gamma_e$ which, after a 3 microsecond delay by element 44, is applied to gate 58 at $T_{35}$—$T_{46}$. Since, as already explained, $E_4$ is on at $T_5$–$T_{47}$ of the first minor cycle of $F_4$, FF #59 is turned on by gate 69 at $T_{35}$ and off by gate 60 at $T_{47}$ of this minor cycle. The output of this FF serves to open gate 58 at $T_{35}$–$T_{46}$ for the new count and to simultaneously inhibit gate 56 for the purpose of erasing the old count.

The count in $C_b$, which was set to $\alpha_e$ in $F_3$, is not disturbed since FF #41 does not go on because of the inhibiting effect of the ascp signal on gate 63. With no output from FF #41, gate 38 of $C_b$ is not inhibited and the contents of the counter are not erased. Gate 40 is not open during $F_4$ so that no input to $C_b$ can occur.

If ($\gamma_e \geqq \beta_e$) the ascp line is not energized. In this case address gate FF 15 is not turned on by gate 52 and, therefore is not applied through address gating circuit 14 to adder 19. However, gate 61 lets one pulse through to the adder at $T_{32}$. Further, regardless of the value of "c," relative address FF 21 is turned on at the start of $F_4$ by gate 62, ascp being off, and its output enables FF #25 to be turned on at $T_{32}$ and off at $T_{44}$ in the usual manner, thus gating the contents of $C_c$ to adder 19 through gate 31. The output of the adder, therefore, is $C_c+1$ and the computer proceeds through the address comparator to seek its next instruction from this address. The control counter is also reset to $C_c+1$ in the same manner as for $\gamma_e$, described above.

One further operation must be carried out: that of setting $C_b$ to 0 if d=1. The control digit "d" appears at the 22 microsecond tap of line 6 at $T_{28}$. If d=1 a pulse appears at $T_{28}$ which is applied to gate 63 of FF #41 during the first minor cycle $E_y$ of $F_4$. With ascp not energized, FF #41 is turned on by this gate at $T_{28}$ and off by gate 43 at $T_{47}$. Gate 38 therefore is inhibited during the period $T_{28}$–$T_{46}$, and since the contents of $C_b$ appear at this gate at $T_{35}$–$T_{46}$, $C_b$ is cleared or reset to zero. If "d" had been 0 instead of 1, FF #41 would have not been turned on by gate 63 and the count in $C_b$ would have remained at $\alpha_e$ to which it was set in $F_3$.

The operation of FIG. 2 in executing a conventional arithmetic instruction, such as one calling for the addition of two numbers, is as follows:

As already stated, in a conventional arithmetic instruction $\alpha_e$ and $\beta_e$ are the effective addresses of the two operands and $\gamma_e$ is the effective address of the memory cell in which the result is to be stored. These addresses may be absolute or relative, depending upon whether a, b and c are 0 or 1, and they may each be realtive to a control counter $C_c$ or a base counter $C_b$ depending upon whether d=0, or d=1, respectively. In executing an instruction of this type $\beta_e$ is determined in $F_1$, $\alpha_e$ in $F_2$, $\gamma_e$ in $F_3$ and $C_c$ is advanced by one in $F_4$. Reference to the timing diagram of FIG. 4 will aid in understanding the following description.

The instruction enters the ISL during $E_y$ of $F_1$ through gates 9 and 8, the digit $P_1$ (FIG. 1) entering first. The staticizer and decoder first senses the operation code ($P_2$–$P_5$) and energizes the proper control line or lines to condition the computer to perform the arithmetical operation called for.

In $F_1$, $\beta$ is gated from the 10 microsecond tap of line 6 through gates 10 and 12 of the address selector circuit 11 and gate 13 of the address gating circuit 14 to adder 19, address gating FF 15 having an output from $T_{32}$–$T_{43}$. The "b" digit is sensed at the 22 microsecond tap by gate 20 at $T_{30}$. If b=1 a pulse appears at $T_{30}$ which initiates an output from relative address FF 21 at $T_{30}$–$T_{47}$ which output in turn results in an output from FF #25 at $T_{32}$–$T_{43}$.

The "d" FF 28 senses the "d" digit at the output of one microsecond delay element 29 at $T_7$. If d=1 a pulse appears at $T_7$ and "d" FF 28 is turned on at $T_7$ and off at $T_{43}$. The "d" FF output inhibits gate 31 and prevents the contents of $C_c$ from reaching adder 19. The contents of $C_b$, however, may pass through gate 32 to the adder provided there is an output from FF #25 (b=1). If d=0, there is no output from the "d" FF, in which case $C_c$ is gated through gate 31 to the adder if there is an output from FF #25 (b=1), and $C_b$ is blocked at gate 32. The output of adder 19 in $F_1$, $\beta_e$, therefore depends upon d as follows:

$$d=0 \qquad \beta_e\beta=+b(C_c)$$
$$d=1 \qquad \beta_e=\beta+b(C_b)$$

This output occurs at $T_{32}$—$T_{43}$ of the first minor cycle of $F_1$ and is the memory address of the first operand. This address is applied to the address comparator which operates to effect read-out of the operand from the corresponding memory cell.

In $F_2$, $\alpha_e$ is obtained at the output of adder 19 and applied to the address comparator by a similar process to that described above for $\beta_e$. The $\alpha$ portion of the instruction is gated from the 46 microsecond tap of delay line 6 through gates 64 and 12 of address selector circuit 11 and gate 13 of the address gating circuit 14 to adder 19, address gating FF 15 being on in $F_2$ as in $F_1$ for the period $T_{32}$–$T_{43}$. The control digit "a" is sensed at the 22 microsecond tap of line 6 by gate 65 at $T_{31}$. The presence of a pulse, indicating that a=1, results in FF #25 being on for the period $T_{32}$–$T_{43}$ as in $F_1$. If a=1, either $C_c$ or $C_b$ is gated to adder 19 depending upon whether d=0 or d=1, the operation of the "d" FF being the same as in $F_1$. The output of the adder in $F_2$ therefore is:

$$d=0 \qquad \alpha_e=\alpha+a(C_c)$$
$$d=1 \qquad \alpha_e=\alpha+a(C_b)$$

The second operand is obtained in $F_2$ from the memory cell corresponding to $\alpha_e$ by the address comparator, and the arithmetical process on the two operands also performed in this phase.

In $F_3$, $\gamma_e$ is obtained at the output of adder 19 by a process similar in all respects to those described for $\beta_e$ and $\alpha_e$. The $\gamma$ portion of the instruction is gated from the 22 microsecond tap through gates 66 and 12 of the address selector circuit and gate 13 of the address gating circuit to adder 19. The "c" digit is sensed at the 22 microsecond tap of delay line 6 by gate 67 of the address gating FF at $T_{29}$. The "d" digit is sensed by the "d" FF as before. As in the cases of b and a in $F_1$ and $F_2$, if c=1 either $C_c$ or $C_b$ is gated to the adder depending upon whether d=0 or d=1, respectively. The output of the adder in $F_3$ therefore is $$d=0 \qquad \gamma_e=\gamma+c(C_c)$$
$$d=1 \qquad \gamma_e=\gamma+c(C_b)$$

Through operation of the address comparator the arithmetical result is read into the memory cell corresponding to $\gamma_e$.

In $F_4$, 1 is added to the control counter $C_c$ to obtain the address of the next instruction. The process is as follows:

Neither the address selector 11 nor the address gating FF 15 has an output in $F_4$. However, FF #53 and FF #50 operate to produce $E_4$ at $T_5$–$T_{47}$ as explained in $F_4$ of the tally instruction. Therefore one pulse passes gate 61 of the adress gating circuit at $T_{32}$ as is applied through gate 18 to adder 19.

The "d" FF does not go in $F_4$. As a result gate 32 is closed and only the control counter $C_c$ can be gated to adder 19. The relative address FF 21, however, is turned on at the start of $F_4$ by gate 68, which results in FF #25 being on during the period $T_{32}$–$T_{43}$. The count in $C_c$ is therefore gated through gate 31 to adder 19 at $T_{32}$–$T_{43}$ where it is added to the 1 applied to the adder at $T_{32}$ by the address gating circuit. The output of the adder therefore is $C_c+1$ which is applied to the address comparator as the address of the next instruction.

The control voltage $E_4$ also allows FF #59 to be turned on by gate 69 at $T_{35}$ and off by gate 60 at $T_{47}$. $C_c+1$ is applied through 3 microsecond delay 44 to gate 58 at $T_{35}$–$T_{46}$. Therefore the $T_{35}$–$T_{46}$ output of FF #59 inserts $C_c+1$ into the control counter and erases the previous count $C_c$. For any succeeding minor cycles in $F_4$ the count in the control counter remains at $C_c+1$ since gate 28 produces an output pulse at $T_{32}$ only in the presence of $E_4$ and, therefore, only in the first minor cycle of $F_4$.

Although the specific control circuits of FIG. 2 are designed for use with three-address instructions the invention is equally applicable to a computer using instructions of the four-address type. In the four-address system a control counter is not used to designate the next instruction as in the three-address system. Instead, a fourth address, designated the $\delta$ address, is added to the instruction for this purpose. Therefore, a tally instruction of the four-address type would contain $\alpha$, $\beta$ and $\gamma$ addresses serving the same purposes as in the three-address tally instruction and in addition a $\delta$ address designating the location of the next instruction. Accordingly, in the execution of the instruction, the operation for the $\alpha_e<\beta_e$ condition would be the same as in the three-address case while for the $\alpha_e\geqq\beta_e$ condition, instead of increasing $C_c$ by one, the computer would seek its next instruction from the location indicated by the $\delta$ address.

I claim:

1. In an automatic digital computer employing instructions having at least three addresses and a base counter to which said addresses may be relative: apparatus for executing a tally instruction, said apparatus comprising means for adding the numerical value of one of said addresses to the contents of said base counter, means for comparing the resulting sum with the numerical value of a second of said addresses, means associated with said comparing means and said base counter and operative when said sum is less than the numerical value of said second address to increase the count in the base counter by the numerical value of said one address and to seek the next instruction at the place indicated by said third address, and means associated with said comparing means and operative when said sum is equal to or greater than the numerical value of said second address to refer the computer to an instruction other than the instruction at the place indicated by said third address.

2. In an automatic digital computer employing three-address instructions and having a control counter for designating the next instruction and a base counter, and in which each of said addresses may be relative to either of said counters: apparatus for executing a tally instruction, said apparatus comprising means for adding the numerical value of one of said addresses to the contents of said base counter, means for comparing the resulting sum with the numerical value of a second of said addresses, and means, associated with said comparing means and said control and base counters, operative when said sum is less than the numerical value of said second address to increase the count in the base counter by the numerical value of said one address and to reset said control counter to a value determined by the third of said addresses and operative when said sum is equal to or greater than the numerical value of said second address to increase the count of said control counter by one.

3. In an automatic digital computer employing three-address instructions and having a control counter for designating the next instruction and a base counter, and in which each of said addresses may be relative to either of said counters: apparatus for executing a tally instruction, said apparatus comprising means for adding the numerical value of one of said addresses to the contents of said base counter, means for comparing the resulting sum with the numerical value of a second of said addresses, and means, associated with said comparing means and said control and base counters, operative when said sum is less than the numerical value of said second address to increase the count in the base counter by the numerical value of said one address and to reset said control counter to a value determined by the third of said addresses and operative when said sum is equal to or greater than the numerical value of said second address to reset said base counter to a predetermined count and to increase the count in said control counter by one.

4. In an automatic digital computer using instructions each containing a first address, a second address and a third address, each address being a binary number, in which there are provided a control counter for designating the next instruction and a base counter, and in which each of said addresses may be relative to one of said counters, apparatus for executing a tally instruction, said apparatus comprising: means for comparing a first quantity which is one of a group of two quantities consisting of the absolute value of the first address of said tally instruction and the sum of said absolute value and the contents of said base counter with a second quantity which is one of a group of two quantities consisting of the absolute value of the second address of said tally instruction and the sum of said absolute value and the contents of said base counter, and means, associated with said comparing means and said control and base counters, operative when said first quantity is less than said second quantity to reset said base counter to said first quantity and said control counter to one of a group of two quantities consisting of the absolute value of the third address of said tally instruction and the sum of said absolute value and the contents of said control counter and operative when said first quantity is not less than said second quantity to increase the count in said control counter by one.

5. In an automatic digital computer using instructions each containing a first address, a second address and a third address, each address being a binary number, in which there are provided a control counter for designating the next instruction and a base counter and in which each of said addresses may be relative to one of said counters, apparatus for executing a tally instruction, said apparatus comprising: means for comparing a first quantity which is one of a group of two quantities consisting of the absolute value of the first address of said tally instruction and the sum of said absolute value and the contents of said base counter with a second quantity which is one of a group of two quantities consisting of the absolute value of the second address of said tally instruction and the sum of said absolute value and the contents of said base counter, and means, associated with said comparing means and said control and base counters, operative when said first quantity is less than said second quantity to reset said base counter to said first quantity and said control counter to one of a group of two quantities consisting of the absolute value of the third address of said tally instruction and the sum of said absolute value and the contents of said control counter and operative when said first quantity is not less than said second quantity to reset said base counter to one of a group of two quantities consisting of said first quantity and zero and to increase the count in said control counter by one.

*6. In an automobile digital computer employing instructions providing at least three addresses relative to each computer directive and a base counter to which said addresses may be relative: apparatus for executing a tally instruction, said apparatus comprising means for adding the numerical value of one of said addresses to the contents of said base counter, means for comparing the resulting sum with the numerical value of a second of said addresses, means associated with said comparing means and said base counter and operative when said sum is less than the numerical value of said second address to increase the count in the base counter by the numerical value of said one address and to seek the next instruction at the place indicated by said third address, and means associated with said comparing means and operative when said sum is equal to or greater than the numerical value of said second address to refer the computer to an instruction other than the instruction at the place indicated by said third address.*

*7. In an automatic digital computer employing instructions providing at least three addresses relative to each computer directive and having a control counter for designating the next instruction and a base counter, and in which each of said addresses may be relative to either of said counters: apparatus for executing a tally instruction, said apparatus comprising means for adding the numerical value of one of said addresses to the contents of said base counter, means for comparing the resulting sum with the numerical value of a second of said addresses, and means, associated with said comparing means and said control and base counters, operative when said sum is less than the numerical value of said second address to increase the count in the base counter by the numerical value of said one address and to reset said control counter to a value determined by the third of said addresses and operative when said sum is equal to or greater than the numerical value of said second address to increase the count of said control counter by one.*

*8. In an automatic digital computer employing instructions providing three addresses relative to each computer directive, each address being a binary quantity, a control counter for designating the next instruction and a base counter and in which each of said addresses may be relative to one of said counters, apparatus for executing a tally instruction, said apparatus comprising: means for comparing a first quantity which is one of a group of two quantities consisting of the absolute value of the first address of said tally instruction and the sum of said absolute value and the contents of said base counter with a second quantity which is one of a group of two quantities consisting of the absolute value of the second address of said tally instruction and the sum of said absolute value and the contents of said base counter, and means, associated with said comparing means and said control and base counters, operative when said first quantity is less than said second quantity to reset said base counter to said first quantity and said control counter to one of a group of two quantities consisting of the absolute value of the third address of said tally instruction and the sum of said absolute value and the contents of said control counter and operative when said first quantity is not less than said second quantity to reset said base counter to one of a group of two quantities consisting of said first quantity and zero and to increase the count in said control counter by one.*

*9. In an automatic digital computer employing instructions providing at least three addresses to the control component of the computer which takes instructions from the computer memory, analyzes these instructions and issues appropriate commands causing the computer to execute the instruction and a base counter to which said addresses may be relative: apparatus for executing a tally instruction, said apparatus comprising means for adding the numerical value of one of said addresses to the contents of said base counter, means for comparing the resulting sum with the numerical value of a second of said addresses, means associated with said comparing means and said base counter and operative when said sum is less than the numerical value of said second address to increase the count in the base counter by the numerical value of said one address and to seek the next instruction at the place indicated by said third address, and means associated with said comparing means and operative when said sum is equal to or greater than the numerical value of said second address to refer the computer to an instruction other than the instruction at the place indicated by said third address.*

References Cited in the file of this patent or the original patent

UNITED STATES PATENTS

| | | |
|---|---|---|
| 2,604,262 | Phelps | July 22, 1952 |
| 2,636,672 | Hamilton | Apr. 28, 1953 |

FOREIGN PATENTS

| | | |
|---|---|---|
| 709,407 | Great Britain | May 26, 1954 |

OTHER REFERENCES

"A Functional Description of the Edvac," vol. II, University of Pennsylvania, Research Report 50–9, Nov. 1, 1949.

Auerbach: "The Binac," Proc. IRE, January 1952, pp. 12–28.